April 19, 1960   S. P. BRUCE ET AL   2,933,078
CONTINUOUS DIAMOND INFEED AND GRINDING WHEEL DRESSER
Filed May 22, 1958   7 Sheets-Sheet 1
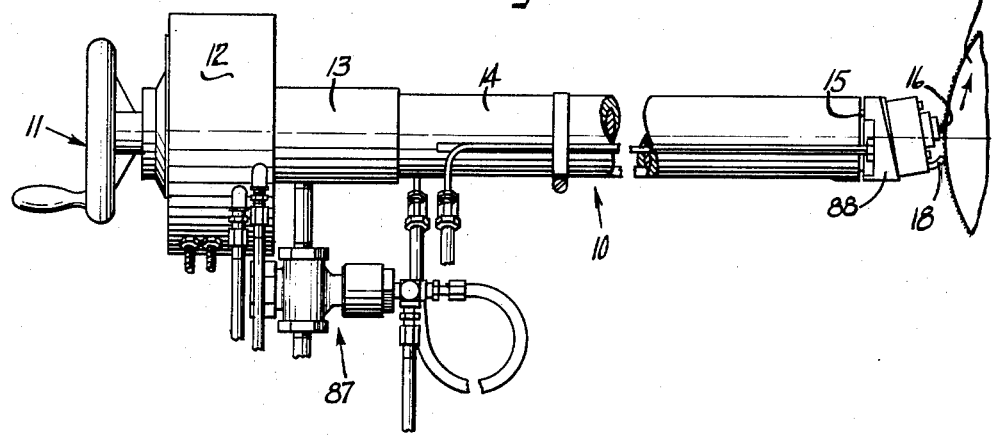
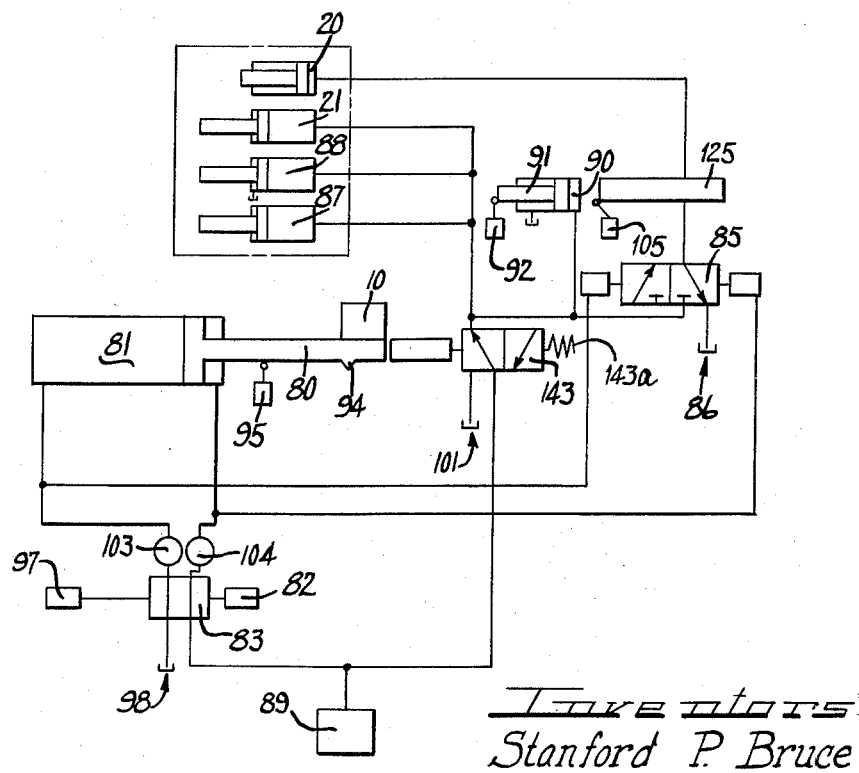
Inventors
Stanford P. Bruce
Arthur T. Kohlstrunk

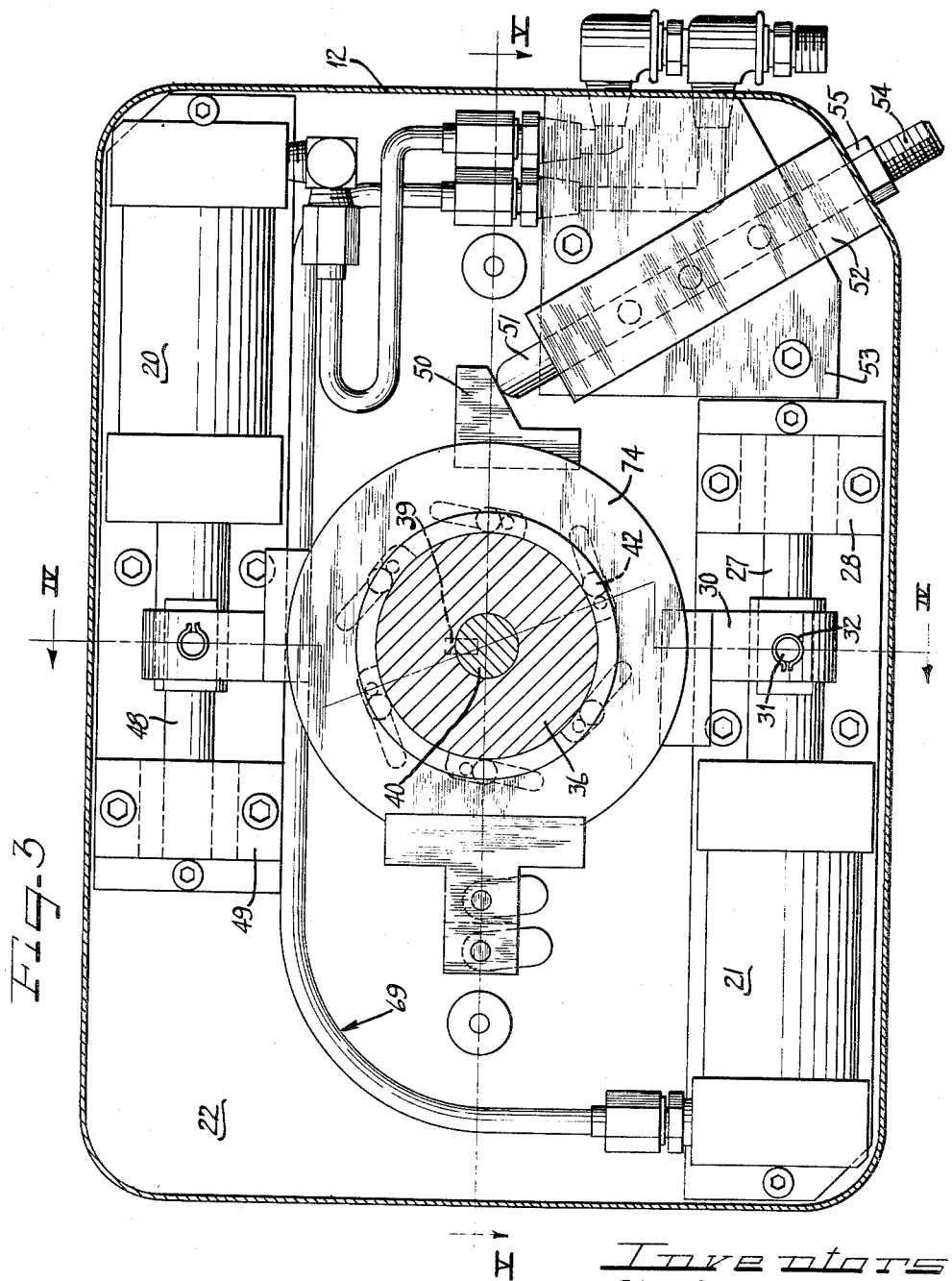

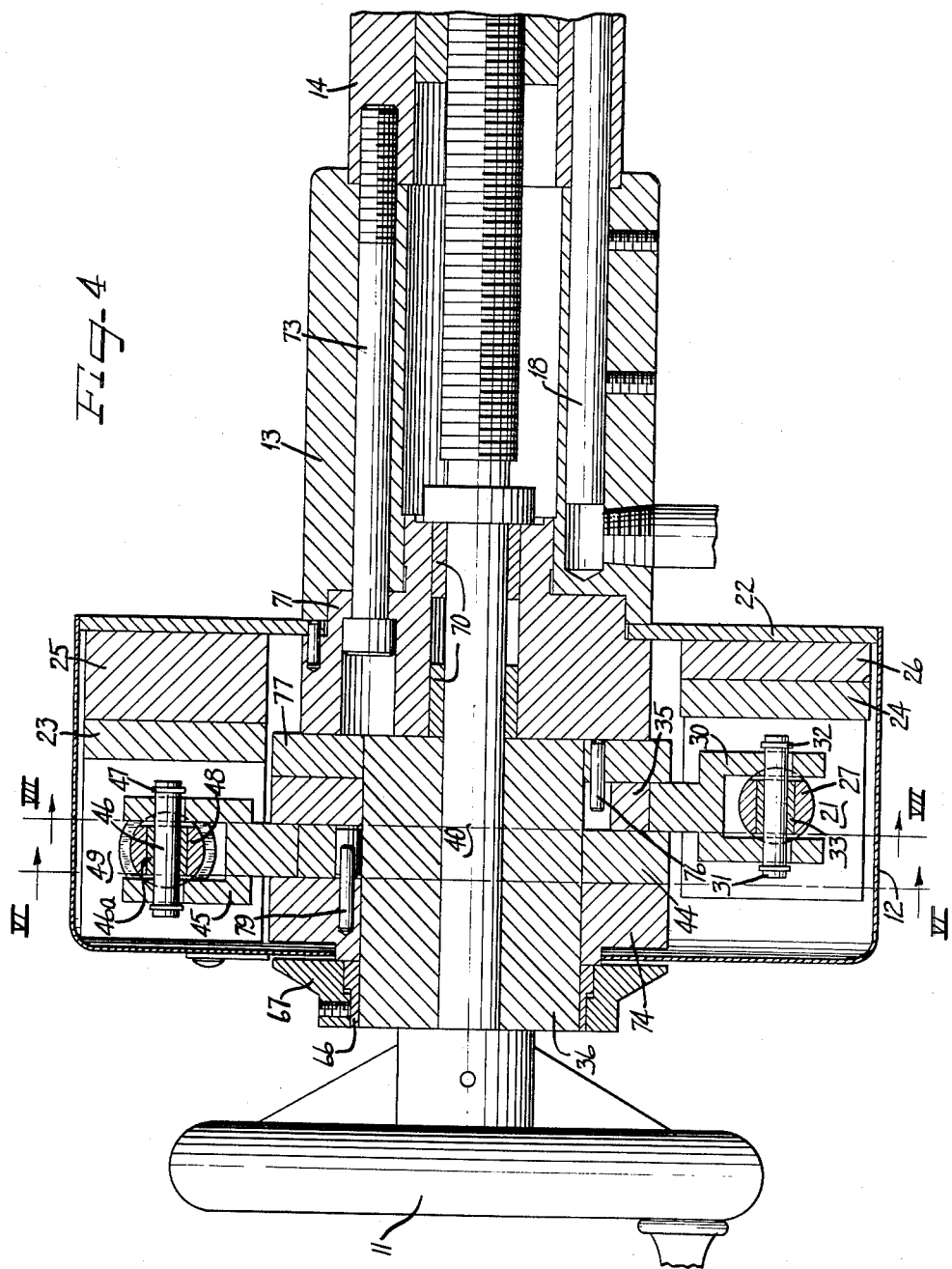

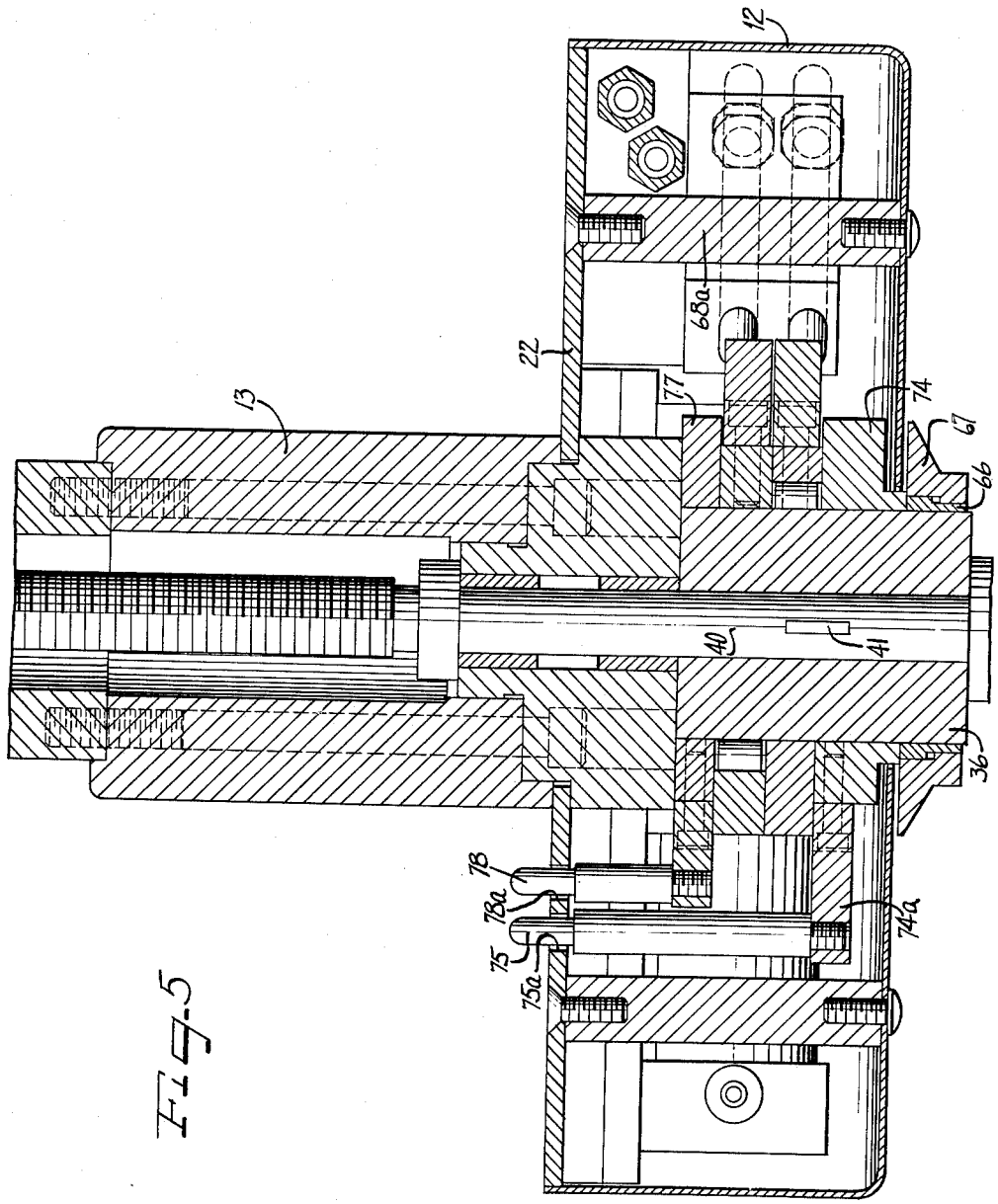

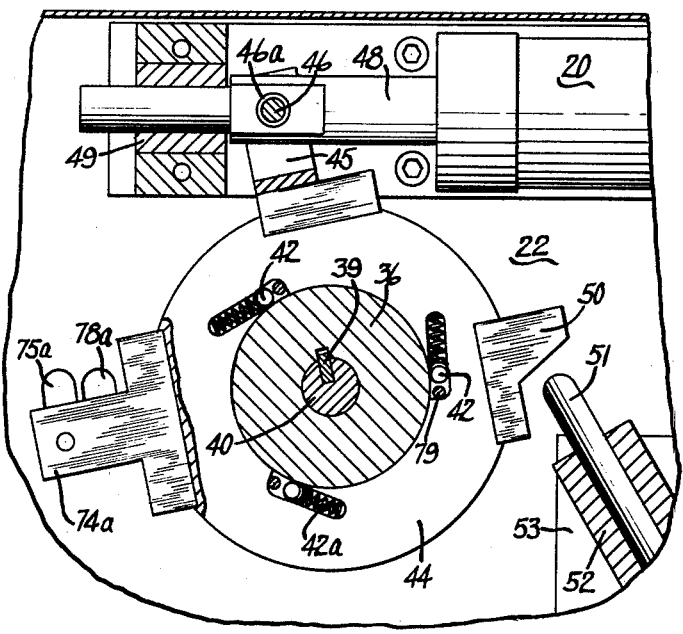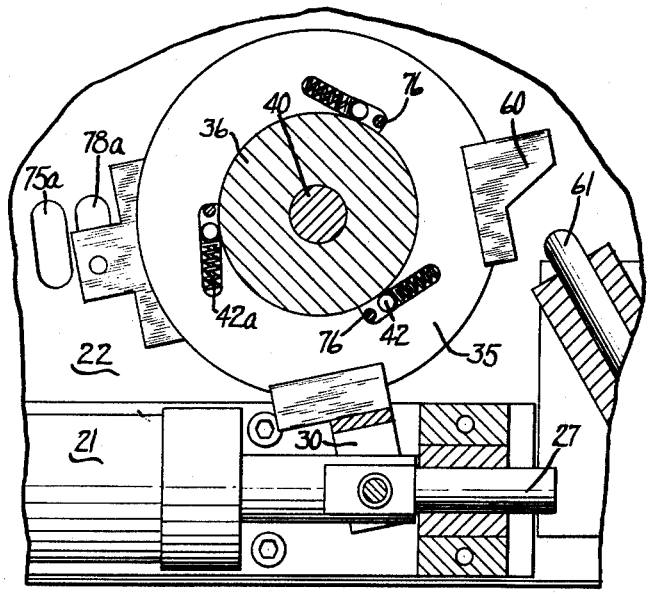

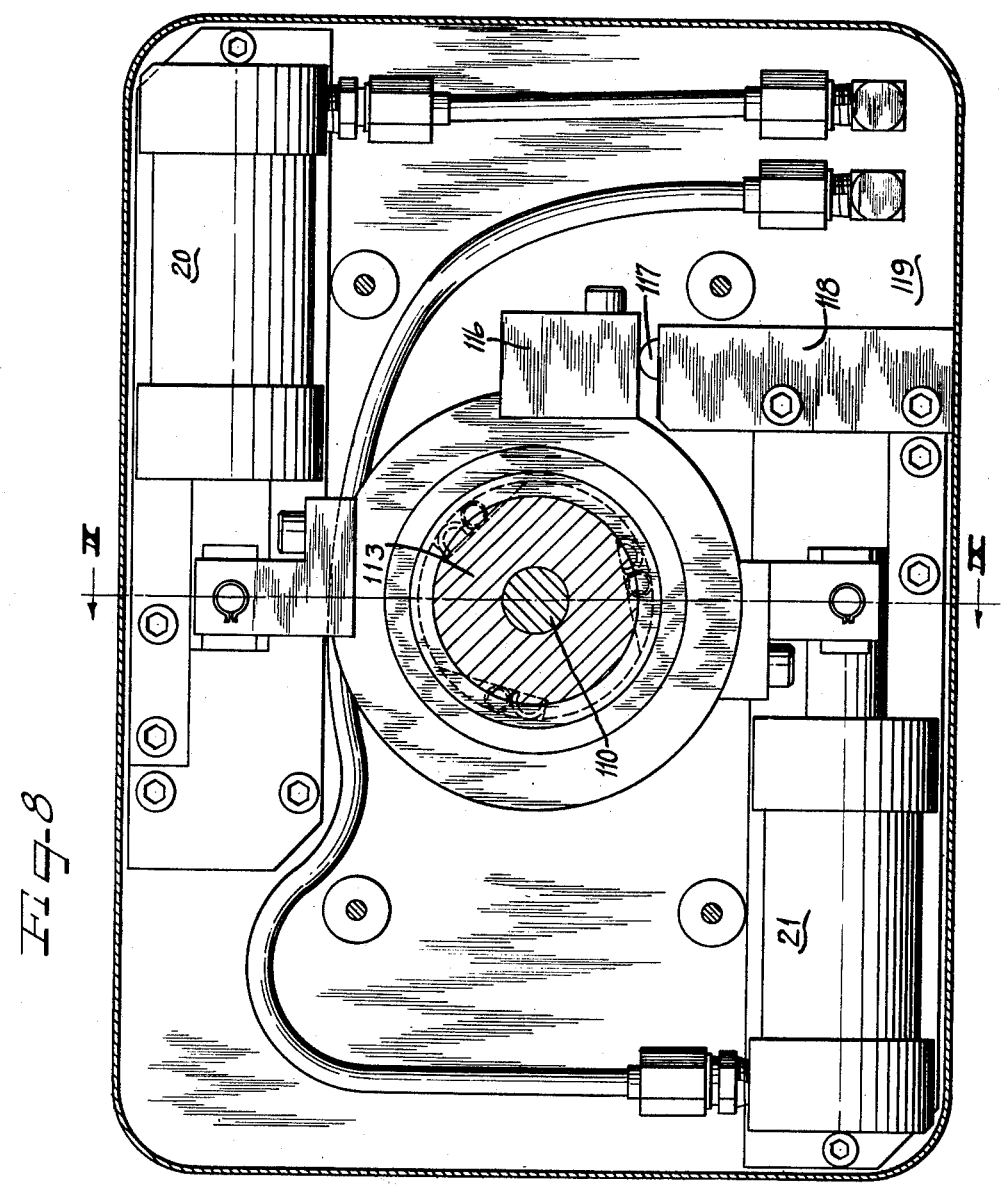

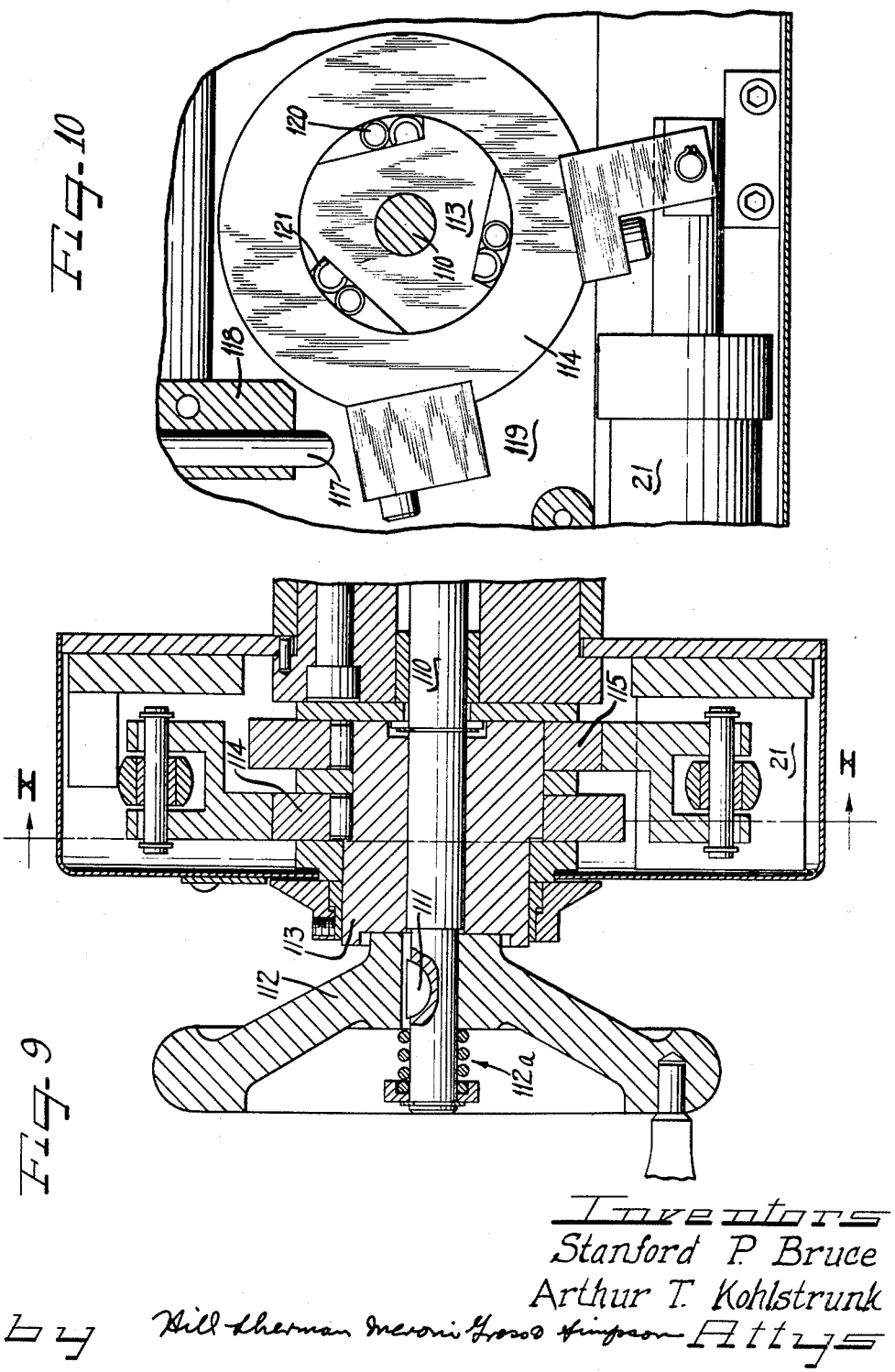

United States Patent Office 2,933,078
Patented Apr. 19, 1960

2,933,078

CONTINUOUS DIAMOND INFEED AND GRINDING WHEEL DRESSER

Stanford P. Bruce and Arthur T. Kohlstrunk, Detroit, Mich., assignors to Wheel Trueing Tool Company, Detroit, Mich., a corporation of Delaware Application May 22, 1958, Serial No. 737,005

18 Claims. (Cl. 125—11)

This invention relates to a semi-automatically controlled hydraulic infeeding mechanism for diamond tools and the like and more particularly relates to a mechanism adapted to continuously dress a grinding wheel without interrupting the operation of the wheel.

Centerless grinding wheels are generally dressed by a dressing mechanism only after the normal flow of stock through the machine has been halted. An amount of three thousandths of an inch, or a fraction thereof, is generally dressed off the dull wheel to regain fresh, sharp cutting grain edges on the wheel and the stock is again allowed to pass through the machine. Obviously, the necessity of having to stop the normal flow of stock through the machine at periodic intervals, greatly decreases the piece work output per unit time. Furthermore, when such a wheel dressing mechanism is used to dress a grinding wheel, the diamond used in the dressing operation is required to dress the grinding wheel at traversing and infeeding rates that may be considerably higher than the diamond's capacity to withstand the generated heat and resultant forces and, in direct consequence, the grinder produces at less than maximum efficiency. Hence, it is obvious that since dressing time is critical, the existing method of periodically halting the normal flow of stock through the grinding machine and then dressing the grinding wheel at a rate greater than that which the diamond dressing tool can withstand is foreshortening the life of the diamond dressing tool and reducing the grinding effectiveness of the wheel.

It would obviously be advantageous to provide an infeeding mechanism which may be used to dress a grinding wheel, which need not interrupt the flow of stock through the grinder, and which is operable to automatically incrementally advance and rotate the dressing tool a predetermined amount commensurate with the attrition of the grinding wheel.

Accordingly, it is a principal object of this invention to provide a semi-automatically electrically controlled, continuously operated, hydraulic infeeding mechanism for diamond tools and the like, which is operable to incrementally advance and incrementally rotate a dressing tool with respect to the grinding wheel, in which the tool is arranged to continuously dress the grinding wheel without interrupting the flow of stock through the grinding machine.

It is a further object of this invention to provide a semi-automatic electrically controlled hydraulic infeeding mechanism for dressing grinding wheels and the like in which the dressing tool carried by the mechanism is advanced in amounts relative to grinding wheel attrition and buildup of foreign particles in the periphery of the wheel due to the grinding action.

These and other objects of the invention will become apparent from time to time as the following specification proceeds and with reference to the accompanying drawings wherein:

Figure 1 is a side elevational view of a hydraulic infeeding mechanism constructed in accordance with the present invention and showing the mechanism in relation to a grinding wheel;

Figure 2 is a diagrammatic view of the hydraulic control system for an infeeding mechanism constructed in accordance with the present invention;

Figure 3 is a vertical sectional view through the control mechanism of the device illustrated in Figure 1;

Figure 4 is a vertical sectional view through the control mechanism illustrated in Figure 3 taken along lines IV—IV of Figure 3;

Figure 5 is a vertical sectional view through the device illustrated in Figures 1, 3, and 4 taken along lines V—V in Figure 3;

Figure 6 is a view taken substantially along lines VI—VI of Figure 4;

Figure 7 is a view taken substantially along lines VII—VII of Figure 4;

Figure 8 is a view similar to Figure 3 but showing a different embodiment of the invention;

Figure 9 is a vertical sectional view through the embodiment of the mechanism illustrated in Figure 8 and taken along lines IX—IX of Figure 8; and Figure 10 is a view similar to Figures 6 and 7 but taken substantially along lines X—X of Figure 9.

In the embodiment of the invention illustrated in Figure 1, there is shown an infeeding mechanism 10 including, generally, a hand wheel 11 which is located in close proximity to a clutch cover 12. Extending from the clutch cover 12 is a barrel extension 13 from which axially extends a relatively long dresser barrel 14 from which, in turn, extends a diamond bar 15 which has a diamond cutting tool 16 or the like removably mounted on its outer end portion. The diamond cutting tool 16 is further shown as being utilized to dress a grinding wheel 17 and as being cooled by coolant flowing through a coolant pipe 18 which coolant flow is directed therethrough by a coolant valve assembly 87.

Referring now more particularly to the embodiment of the invention illustrated in Figures 3 and 4, front and rear hydraulic cylinders 20 and 21, respectively, are shown as being firmly secured to a back plate 22 and properly positioned with respect thereto by cylinder plates 23 and 24 and by riser bars 25 and 26. The outer end portion of the cylinder rod 27 which is extensibly movable from the rear hydraulic cylinder 21, is free to be moved outwardly under hydraulic pressure and to travel into the rear pillow block 28. A rear clutch yoke 30 is removably connected to the cylinder rod 27 by means of a clutch yoke pin 31 which extends through axially aligned apertures in the clutch yoke 30 and the cylinder rod 27 and which is maintained in position by retainers 32. A rear cylinder rod bushing 33 fits snugly within the aperture within the cylinder rod 27 and serves to accurately align the clutch yoke pin 31 within the aperture.

The rear clutch yoke 30 is movably secured to the rear clutch 35 which encompasses the clutch cylinder 36 and the clutch cylinder 36 is, in turn, rigidly secured to the feed screw 40 by means of a key 39. As will hereafter be more clearly explained the diamond dressing tool 16 is arranged to rotatably and reciprocably move with the feed screw 40 and is rigidly connected thereto.

Referring now particularly to Figure 7, it will become apparent that the clutch cylinder 36 and the feed screw 40 will rotate a predetermined incremental amount by the action of the overrunning wedge roller rear clutch 35 having clutch rollers 42 which are arranged to be firmly wedged between the inner peripheral surface of the clutch 35 and the clutch cylinder 36 when hydraulic pressure actuates the rear hydraulic cylinder 21. It will here suffice to say that incremental rotation of the feed screw 40 is operable to incrementally advance the diamond tool toward the grinding wheel and that the infeeding mechanism is arranged to automatically traverse the face of the grinding wheel. The infeeding and traversing characteristics of this device will be hereinafter explained in more detail.

The front clutch mechanism (see Figure 6) operates in a similar manner and includes generally an overrunning wedge roller front clutch 44, a front clutch yoke 45 having a front clutch yoke pin 46 maintained in the clutch yoke by means of retainers 47 and having a front cylinder rod bushing 46a. This front clutch mechanism is associated with the front hydraulic cylinder 20 which has a reciprocably movable cylinder rod 48 which is arranged to move within a front pillow block 49 secured to the back plate 22.

Through the use of the independently operated clutches, described above as the front clutch 44 and the rear clutch 35, the infeed mechanism can develop differential diamond dressing tool advance during one complete dressing cycle as will hereinafter be described further in detail.

To accurately arrive at different and specific amounts of infeed, the front clutch stop 50, which is rigidly secured to the front clutch 44 is arranged to restrict the rotary motion of the front clutch 44 as the clutch is returned in a clockwise position by the return spring (not shown) within the front hydraulic cylinder 20 when the front hydraulic cylinder is hydraulically deactuated. It will be noted that a stop pin 51 is mounted within a stop pin holder 52 which, in turn, is mounted on a manifold 53 that is mounted on the back plate 22. It will further be noted that by advancing the front clutch stop pin 51 within the stop pin holder 52 by means of the infeed adjusting screw 54 and the infeed adjusting screw lock nut 55, the clockwise rotary motion of the front clutch 44 may be further restricted so that the front clutch 44 is operable upon actuation of the front hydraulic cylinder 20 to rotate the clutch cylinder 36 and the feed screw 40 to a lesser degree.

In a similar manner, the first pass infeed is controlled by the rear clutch stop 60 (see Fig. 7), rear clutch stop pin 61, an infeed adjusting screw (not shown) and an infeed adjusting screw lock nut (also not shown).

Each of Figures 6 and 7 illustrate the positioning of the various parts of the front and rear clutch mechanisms when the front and rear hydraulic cylinders are in a hydraulically actuated condition.

A dial insert 66 frictionally engages the outer circumference of the clutch cylinder 36 and has a dial 67 mounted thereon exteriorly of the clutch cover 12 which is spaced from and connected to the back plate 22 by the connecting pins 68a so that visual reference of the degree of infeed for both dressing passes may be taken from the dial as it rotates with the clutch cylinder 36.

As shown in Figure 3, hydraulic pressurized fluid is directed to both the front and rear hydraulic cylinders 20 and 21, respectively, through the manifold 53 and by means of suitable tubing as indicated generally at 69.

Infeeding of the diamond tool 16 toward the grinding wheel 17 is effected by extensible longitudinal movement of the diamond bar 15 as the feed screw 40 rotates, in predetermined increments, within the guide bushings 70 which are supported by the sleeve guide 71. The sleeve guide 71 serves to properly position and space the clutch mechanism from the back plate 22 and is maintained in engagement with the barrel extension 13 by means of a connection bolt 73 which extends through the sleeve guide 71, the barrel extension 13, and is threadably mounted in the dresser barrel 14.

When the diamond bar 15 has reached its limit of extensible travel from the dresser barrel 14 or when the operator wishes to install a new grinding wheel, it becomes desirable to provide a means for returning the diamond bar to its original position. To accomplish this, a means is provided for taking the wedge rollers 42 out of driving engagement with the clutch cylinder 36. It will be apparent in Figure 6 that the wedge rollers 42 are biased into engagement by springs 42a and that a wedge roller release pin 79 is provided adjacent each wedge roller 42 to move the rollers against the force of the springs 42a to take the wedge rollers out of driving engagement with the clutch cylinder 36.

Referring now more particularly to Figures 4 through 6, it will become apparent that the wedge roller release pins 79 are rigidly connected to the release pin disc 74 which may, in turn, be perpendicularly connected through an intermediate connecting plate 74a to a front clutch release lever 75 which extends throught an elongated aperture 75a in the back plate 22. Similarly, wedge roller release pins 76 are provided to take the rear clutch 35 out of driving engagement with the clutch cylinder 36. The wedge roller release pins 76 are rigidly connected to a rear release pin disc 77 which is manually rotatable by the rear clutch release lever 78 which extends through an elongated aperture 78a in the back plate 22. Obviously, when the wedge rollers are freed by the wedge release pins 76 and 79 from their wedged positions between the front and rear clutches 44 and 35, respectively, the clutch cylinder 36 is allowed to freely rotate with the feed screw 40 so that the diamond bar 15 can be manually retracted by the hand wheel 11.

Figure 2 of the drawings diagrammatically illustrates the hydraulic control system for controlling the infeeding and rotation of the diamond tool. The infeeding mechanism 10 is shown as being secured to the outer end portion of a piston 80 which is arranged to reciprocably longitudinally move within a dresser traverse cylinder 81. In this manner, reciprocal movement of the piston 80 will cause the infeeding mechanism 10 to move back and forth across the face of the grinding wheel 17.

To begin the operation of the infeeding mechanism a solenoid 82 is actuated by a manually operated start switch (not shown) and hydraulic fluid under pressure is directed from a hydraulic pump 89 through the two-position four-way solenoid control valve 83 to the right side of the dresser traverse cylinder as shown in Figure 2 causing the piston 80 to move longitudinally to the left to initiate the dressing cycle. As the piston 80 moves the dresser assembly 10 through the first pass across the grinding wheel the spool within a mechanically operated valve 143 which abuts the piston 80 is moved by spring member 143a to a position to communicate the rear hydraulic cylinder 21, the coolant control valve 87 and the hydraulic diamond rotating tool 88 with the hydraulic pump 89. Simultaneously, hydraulic pressure is communicated through a suitable hydraulic line from the control valve 83 to a two-position three-way pilot operated valve 85 to position the pilot therein as shown in Figure 2 to communicate the front hydraulic cylinder 20 with a reservoir 86. At the same time the right side of the continuous dressing actuator 90 (as seen in Figure 2) is communicated with hydraulic fluid under pressure from the hydraulic pump 89 causing the piston 91 to move extensibly therefrom to open a start limit switch 92 for purposes which will hereinafter become apparent.

As the dresser assembly approaches the end of its traverse across the grinding wheel, the lever arm 94 on the outer end of the piston 80 contacts the limit switch 95, which is arranged to actuate the solenoid 97 and to simultaneously communicate the right side of the dresser traverse cylinder 81 with a reservoir 98. Hydraulic pressure being fed to the left hand side of the dresser traverse cylinder 81 is sensed through suitable hydraulic lines by the pilot operated valve 85 and the spool therein is so moved as to communicate the front hydraulic cylinder 20 with the hydraulic pump 89 and to simultaneously close off the communication between the hydraulic cylinder 20 and the reservoir 86. As the piston 80 returns to its original position at the right side of the dresser traverse cylinder 81 the mechanically operated valve 143 is actuated by direct contact with the piston 80 to communicate the rear hydraulic cylinder 21, the coolant control valve 87 and the hydraulic diamond rotating tool 88 with a reservoir 101 to exhaust hydraulic fluid from the hydraulic cylinder 21, the coolant valve assembly 87, the hydraulic diamond rotating tool, and the continuous dressing actuator cylinder 90.

As hydraulic fluid is exhausted from the continuous dressing actuator 90, the piston 91 therein moves retractably and allows the start limit switch 92 to close to thereby reactuate the solenoid 82 thus automatically initiating a new cycle as has been described above. A restriction in the pressure line leading to the continuous dressing actuator 90 may be provided to assure that each of the other hydraulic elements in the system have adequate time to exhaust properly.

It should further be noted that the speed of dresser traverse may be accurately manually controlled by simply varying the orifice opening in the flow control devices 103 and 104 which are placed in the hydraulic lines between the double solenoid hydraulic control valve 83 and the dresser traverse cylinder 81.

A stock controlled limit switch 105 may be provided within the electrical circuit of this apparatus to take the place of the manually operable start switch (not shown) which is operable to actuate the solenoid 82 to initiate the dresser traverse cycle. It may, of course, be used in combination with a manually operable start switch or master switch. The limit switch 105 may be located at the input end of a feed trough to the grinding wheel 17 in such a manner that the switch will be closed whenever stock is flowing to the grinding wheel as diagrammatically shown in Figure 2 and as indicated by the numeral 125.

In this manner, the dressing mechanism will continuously traverse and dress the grinding wheel whenever stock is flowing thereto and will automatically stop whenever the flow of stock to the grinding wheel ceases. Accordingly, since the dressing operation on the grinding wheel is an automatically continuous one, the dressing mechanism will dress off only an infinitesimally small amount thus lengthening the life of the diamond tool.

Referring now more particularly to Figures 8, 9, and 10 of the drawings, another embodiment of the invention has been shown which operates on the same basic principles as the mechanism previously described but which is more economical to manufacture and which has a fewer number of component parts than the mechanism previously described.

In this embodiment of the invention the feed screw 110 is connected by a key 111 to the hand wheel 112 which is, in turn, releasably connected to the clutch cylinder 113 by a spring lock 112a. Thus, it will be understood that in this embodiment of the invention the feed screw 110 is rigidly connected only to the hand wheel 112 and is not directly connected with the clutch cylinder 113. Hence, it will be noted that by merely disengaging the hand wheel 112 from the clutch cylinder 113 the feed screw 110 can be manually retracted by rotating the hand wheel, without necessitating the disengagement of the front and rear clutches 114 and 115, respectively, from the clutch cylinder 113.

Referring more particularly to Figure 8, it will be seen that the rear clutch stop 116 is of slightly different configuration while serving the same purpose as previously mentioned and that the rear clutch stop pin 117 and the rear clutch stop pin housing 118 have been repositioned on the back plate 119. As may be seen in Figure 10, the wedge roller clutch mechanism is quite simplified in comparison to the embodiment of the invention illustrated in Figures 3 through 7 since it is not necessary to drivingly disengage the front clutch 114 from the clutch cylinder 113. It will be noted that in this embodiment of the invention the wedge rollers 120 are movable and associated with the clutch cylinder 113 rather than with the front clutch 114. The wedge rollers 120 are biased into driving engagement with the front clutch 114 by the springs 121.

Obviously, the embodiment illustrated in Figures 8 through 10 is of a simpler design and may be more economically manufactured than that embodiment of the invention previously illustrated and described.

It will be understood from the foregoing, that a continuous diamond tool infeeding and grinding wheel dressing mechanism has been provided in which a grinding wheel in a high production grinding apparatus can be dressed about interrupting the normal flow of stock passing through the machine. Obviously, a grinding wheel equipped with such a dressing mechanism is assured of constant sharpness and of maintaining a continuous flow of accurately ground stock though the machine. Furthermore, under automatic electrical control the dressing mechanism can be arranged to advance the diamond tool in amounts relative to grinding wheel attrition and the buildup of foreign particles in the periphery of the wheel due to grinding action.

It will herein be understood that these embodiments of the invention have been used for illustrative purposes only and that various modifications and variations may be effected without departing from the spirit and scope of the novel concepts thereof.

We claim as our invention:

1. A mechanism for continuously dressing grinding wheels and the like comprising a housing, a feed screw shaft threadably mounted in said housing and having means at the outer end thereof for attaching a dressing tool thereto, a clutch cylinder encircling said shaft and drivingly connected therewith, at least two one way wedge roller clutches encircling said cylinder to rotatably drive said cylinder, means for independently oscillating said clutches to incrementally extensibly more said shaft from said housing, manual means for releasing the driving connection between said clutches and said feed screw shaft, and manual means for rotating said feed screw shaft to retractably move said shaft within said housing when said clutches are out of driving connection with said shaft.

2. An infeeding mechanism of the class described comprising a housing, a feed screw shaft threadably mounted in said housing and having means at the outer end thereof for connecting a tool to said shaft, a clutch cylinder encircling said shaft and drivingly connected therewith, a pair of one way roller clutches encircling said clutch cylinder to rotatably drive said cylinder, a pair of hydraulic cylinders having pistons extensible therefrom, motion translation means for interconnecting said pistons with said clutches to independently rotate each of said clutches through a predetermined arc, means for alternately automatically actuating each of said hydraulic cylinders to effect a substantially constant infeeding of said feed screw shaft, manual means for releasing the driving engagement between said clutches and said feed screw shaft, and manual means for rotating said feed screw shaft to retractably move said shaft within said housing when said clutches are out of driving connection with said shaft.

3. A mechanism for continuously dressing grinding wheels and the like comprising a housing, a feed screw shaft threadably mounted in said housing and having means at the outer end thereof for attaching a dressing tool thereto, a clutch cylinder encircling said shaft and drivingly connected therewith, a pair of one way wedge roller clutches encircling said cylinder to rotatably drive said cylinder, means for independently oscillating said clutches to incrementally extensibly move said shaft from said housing, manual means for releasing said clutches from driving engagement with said clutch cylinder, and manual means for rotating said feed screw shaft to retract said shaft when said clutches are out of driving engagement with said clutch cylinder.

4. An infeeding mechanism of the class described comprising a housing, a feed screw shaft threadably mounted in said housing and having means at the outer end thereof for connecting a tool to said shaft, a clutch cylinder encircling said shaft and drivingly connected therewith, a pair of one way roller clutches encircling said clutch cylinder to rotatably drive said cylinder, a pair of hydraulic cylinders having pistons extensible therefrom, motion translation means for interconnecting said thrust pins with said clutches to independently rotate each of said clutches through a predetermined arc, means for alternately automatically actuating each of said hydraulic cylinders to effect a substantially constant infeeding of said feed screw shaft, manual means for releasing said clutches from driving engagement with said clutch cylinder, and manual means for rotating said feed screw shaft to retract said shaft when said clutches are out of driving engagement with said clutch cylinder.

5. A mechanism for continuously dressing grinding wheels and the like comprising a housing, a feed screw shaft threadably mounted in said housing and having means at the outer end thereof for attaching a dressing tool thereto, a clutch cylinder encircling said shaft and drivingly connected therewith, a pair of one way wedge roller clutches encircling said cylinder to rotatably drive said cylinder, means for independently alternately oscillating said clutches to continuously and incrementally extensibly move said shaft from said housing, manual means for taking said clutch cylinder and said feed screw shaft out of driving engagement with one another, and manual means for rotating said feed screw shaft to retract said shaft when said shaft and said clutch cylinder are out of driving engagement with one another.

6. An infeeding mechanism of the class described comprising a housing, a feed screw shaft threadably mounted in said housing and having means at the outer end thereof for connecting a tool to said shaft, a clutch cylinder encircling said shaft and drivingly connected therewith, a pair of one way roller clutches encircling said clutch cylinder to rotatably drive said cylinder, a pair of hydraulic cylinders having pistons extensible therefrom, motion translation means for interconnecting said thrust pins with said clutches to independently rotate each of said clutches through a predetermined arc, means for alternately automatically actuating each of said hydraulic cylinders to effect a substantially constant infeeding of said feed screw shaft, manual means for drivingly disconnecting said clutch cylinder and said feed screw shaft, and manual means for rotating said feed screw shaft to retract said shaft when said shaft and said clutch cylinder are out of driving connection with respect to one another.

7. A mechanism for continuously dressing grinding wheels and the like comprising a housing, a feed screw shaft threadably mounted in said housing and having means at the outer end thereof for attaching a dressing tool thereto, a clutch cylinder encircling said shaft and drivingly connected therewith, a pair of one way wedge roller clutches having a plurality of wedge rollers therein to drivingly engage said clutch cylinder, means for independently alternately oscillating said clutches to continuously and incrementally extensibly move said shaft from said housing, manual means for moving said wedge rollers out of driving engagement with said clutch cylinder, and manual means for rotating said feed screw shaft to retract said shaft when said wedge rollers are out of driving engagement with said clutch cylinder.

8. An infeeding mechanism of the class described comprising a housing, a feed screw shaft threadably mounted in said housing and having a means at the outer end thereof for connecting a tool to said shaft, a clutch cylinder encircling said shaft and drivingly connected therewith, a pair of one way wedge roller clutches having a plurality of wedge rollers to drivingly engage said clutch cylinder, a pair of hydraulic cylinders having thrust pins extensible therefrom, motion translation means for interconnecting said thrust pins with said clutches to rotatably move said clutches, means for alternately automatically actuating each of said hydraulic cylinders to effect a substantially constant infeeding of said feed screw shaft, manual means for moving said wedge rollers out of driving engagement with said clutch cylinder, and manual means for rotating said feed screw shaft to retract said shaft when said wedge rollers are out of driving engagement with said clutch cylinder.

9. An infeeding mechanism of the class described comprising a housing, a feed screw shaft threadably mounted in said housing and having means at the outer end thereof for connecting a tool to said shaft, a clutch cylinder encircling said shaft and drivingly connected therewith, a pair of one way roller clutches encircling said clutch cylinder to rotatably drive said cylinder, a pair of hydraulic cylinders having pistons extensible therefrom, motion translation means for interconnecting said pistons with said clutches to independently rotate each of said clutches through a predetermined arc, manual means for releasing the driving engagement between said clutches and said feed screw shaft, manual means for rotating said feed screw shaft to retractably move said shaft within said housing when said clutches are out of driving connection with said shaft, a traverse cylinder arranged to movably support said infeeding mechanism, a piston within said traverse cylinder and having an arm extensible therefrom, said infeeding mechanism being substantially perpendicularly connected to said piston arm, and means for alternately directing pressurized hydraulic fluid to each side of said piston to effect reciprocable movement thereof.

10. An infeeding mechanism of the class described comprising a housing, a feed screw shaft threadably mounted in said housing and having means at the outer end thereof for connecting a tool to said shaft, a clutch cylinder encircling said shaft and drivingly connected therewith, a pair of one way roller clutches encircling said clutch cylinder to rotatably drive said cylinder, a pair of hydraulic cylinders having pistons extensible therefrom, motion translation means for interconnecting said pistons with said clutches to independently rotate each of said clutches through a predetermined arc, manual means for releasing said clutches from driving engagement with said clutch cylinder, manual means for rotating said feed screw shaft to retract said shaft when said clutches are out of driving engagement with said clutch cylinder, a traverse cylinder arranged to movably support said infeeding mechanism, a piston within said traverse cylinder and having an arm extensible therefrom, said infeeding mechanism being substantially perpendicularly connected to said piston arm, and means for alternately directing pressurized hydraulic fluid to each side of said piston to effect reciprocable movement thereof.

11. An infeeding mechanism of the class described comprising a housing, a feed screw shaft threadably mounted in said housing and having means at the outer end thereof for connecting a tool to said shaft, a clutch cylinder encircling said shaft and drivingly connected therewith, a pair of one way roller clutches encircling said clutch cylinder to rotatably drive said cylinder, a pair of hydraulic cylinders having pistons extensible therefrom, motion translation means for interconnecting said pistons with said clutches to independently rotate each of said clutches through a predetermined arc, manual means for drivingly disconnecting said clutch cylinder and said feed screw shaft, manual means for rotating said feed screw shaft to retract said shaft when said shaft and said clutch cylinder are out of driving connection with respect to one another, a traverse cylinder arranged to movably support said infeeding mechanism, a piston within said traverse cylinder and having an arm extensible therefrom, said infeeding mechanism being substantially perpendicularly connected to said piston arm, and means for alternately directing pressurized hydraulic fluid to each side of said piston to effect reciprocable movement thereof.

12. An infeeding mechanism of the class described comprising a housing, a feed screw shaft threadably mounted in said housing and having a means at the outer end thereof for connecting a tool to said shaft, a clutch cylinder encircling said shaft and drivingly connected therewith, a pair of one way wedge roller clutches having a plurality of wedge rollers to drivingly engage said clutch cylinder, a pair of hydraulic cylinders having thrust pins extensible therefrom, motion translation means for interconnecting said thrust pins with said clutches to rotatably move said clutches, manual means for moving said wedge rollers out of driving engagement with said clutch cylinder, manual means for rotating said feed screw shaft to retract said shaft when said wedge rollers are out of driving engagement with said clutch cylinder, a traverse cylinder arranged to movably support said infeeding mechanism, a piston within said traverse cylinder and having an arm extensible therefrom, said infeeding mechanism being substantially perpendicularly connected to said piston arm, and means for alternately directing pressurized hydraulic fluid to each side of said piston to effect reciprocable movement thereof.

13. A mechanism for continuously dressing grinding wheels and the like comprising a housing, a feed screw shaft threadably mounted in said housing and having means at the outer end thereof for attaching a dressing tool thereto, a clutch cylinder encircling said shaft and drivingly connected therewith, a pair of one way wedge roller clutches encircling said cylinder to rotatably drive said cylinder arranged when driven in one direction to rotate said feed screw shaft and to slip on said feed screw shaft when driven in an opposite direction, means for independently and alternately oscillating said clutches to continuously and incrementally extensibly move said shaft from said housing, disengagement means coupled with said clutch for taking said overrunning clutch out of driving engagement with said clutch cylinder, and means for manually rotatably retractably moving said feed screw shaft when said wedge roller clutch is out of driving engagement with said clutch cylinder.

14. An infeeding mechanism of the class described for dressing a grinding wheel comprising a housing, a feed screw shaft threadably mounted in said housing and having means at the outer end thereof for connecting a tool to said shaft, a clutch cylinder encircling said shaft and drivingly connected therewith, a pair of one way roller clutches encircling said clutch cylinder to rotatably drive said cylinder, a pair of hydraulic cylinders having pistons extensible therefrom, motion translation means for interconnecting said thrust pins with said clutches to independently rotate each of said clutches through a predetermined arc, means for alternately automatically actuating each of said hydraulic cylinders in response to the flow of stock to said grinding wheel to effect a substantially constant infeeding of said feed screw shaft, manual means for releasing said clutches from driving engagement with said clutch cylinder, and manual means for rotating said feed screw shaft to retract said shaft when said clutches are out of driving engagement with said clutch cylinder.

15. An infeeding mechanism of the class described for dressing a grinding wheel comprising a housing, a feed screw shaft threadably mounted in said housing and having means at the outer end thereof for connecting a tool to said shaft, a clutch cylinder encircling said shaft and drivingly connected therewith, a pair of one way roller clutches encircling said clutch cylinder to rotatably drive said cylinder, a pair of hydraulic cylinders having pistons extensible therefrom, motion translation means for interconnecting said pistons with said clutches to independently rotate each of said clutches through a predetermined arc, means for alternately automatically actuating each of said hydraulic cylinders in response to the flow of stock to said grinding wheel to effect a substantially constant infeeding of said feed screw shaft, manual means for drivingly disconnecting said clutch cylinder and said feed screw shaft, and manual means for rotating said feed screw shaft to retract said shaft when said shaft and said clutch cylinder are out of driving connection with respect to one another.

16. An infeeding mechanism of the class described for dressing a grinding wheel comprising a housing, a feed screw shaft threadably mounted in said housing and having means at the outer end thereof for connecting a tool to said shaft, a clutch cylinder encircling said shaft and drivingly connected therewith, a pair of one way roller clutches encircling said clutch cylinder to rotatably drive said cylinder, a pair of hydraulic cylinders having pistons extensible therefrom, motion translation means for interconnecting said pistons with said clutches to independently rotate each of said clutches through a predetermined arc, manual means for releasing the driving engagement between said clutches and said feed screw shaft, manual means for rotating said feed screw shaft to retractably move said shaft within said housing when said clutches are out of driving connection with said shaft, a traverse cylinder arranged to movably support said infeeding mechanism, a piston within said traverse cylinder and having an arm extensible therefrom, said infeeding mechanism being substantially perpendicularly connected to said piston arm, valve means for alternately directing pressurized hydraulic fluid to each side of said piston to effect reciprocable movement thereof, and a limit switch arranged to energize said valve means and controlled by the flow of stock to said grinding wheel.

17. An infeeding mechanism of the class described comprising a housing, a feed screw shaft threadably mounted in said housing and having a means at the outer end thereof for connecting a tool to said shaft, a clutch cylinder encircling said shaft and drivingly connected therewith, a pair of one way wedge roller clutches having a plurality of wedge rollers to drivingly engage said clutch cylinder, a pair of hydraulic cylinders having thrust pins extensible therefrom, motion translation means for interconnecting said thrust pins with said clutches to rotatably move said clutches, manual means for moving said wedge rollers out of driving engagement with said clutch cylinder, manual means for rotating said feed screw shaft to retract said shaft when said wedge rollers are out of driving engagement with said clutch cylinder, a traverse cylinder arranged to movably support said infeeding mechanism, a piston within said traverse cylinder and having an arm extensible therefrom, said infeeding mechanism being substantially perpendicularly connected to said piston arm, and means for alternately directing pressurized hydraulic fluid to each side of said piston in response to the flow of stock through said grinding wheel to effect reciprocable movement thereof.

18. A dressing mechanism for dressing abrading wheels and the like comprising a housing, a feed screw shaft threadedly mounted in said housing having a dressing tool mounted on the outer end thereof, at least two torque transmission means coupled with said shaft to rotatably drive said shaft to infeed said tool to an abrading wheel, and means for independently energizing said torque transmission means to effect continuous infeeding of said feed screw shaft.

References Cited in the file of this patent

UNITED STATES PATENTS 2,845,921    Loecy  ---------------- Aug. 5, 1958